Patented Jan. 19, 1943

2,309,079

UNITED STATES PATENT OFFICE 2,309,079

TREATMENT OF PAPER

Harold S. Mitchell, Chicago, Ill., assignor to Industrial Patents Corporation, Chicago, Ill., a corporation of Delaware No Drawing. Original application September 13, 1935, Serial No. 40,460. Divided and this application November 23, 1938, Serial No. 242,090

5 Claims. (Cl. 99—171)

This invention relates to the treatment of paper prepared for use in wrapping fats and oils or products containing fats and oils.

This application is a division of my application entitled Paper treatment, Serial No. 40,460, filed September 13, 1935, which has matured into United States Patent Number 2,155,731.

One of the objects of the invention is to provide a method for treating paper stock used in packaging bakery products.

Another object of the invention is to provide a treated paper suitable for packaging bakery products.

Other objects of the invention will be apparent from the description and claims which follow.

It is customary to package crackers, cookies and similar bakery products, which must be held for a considerable length of time between packaging and consumption, in cardboard boxes. Such products contain shortening, some of which soaks into the cardboard. Due to the accelerating action of certain ingredients of the cardboard, the fats become rancid and produce an unsavory odor at the time the package is opened. The presence of the rancid fat in the cardboard may or may not adversely affect the product packed in the carton, but in any event the odor is offensive and in the case of delicately flavored product may cause deterioration of the product itself. It appears that the onset of rancidity of the fat soak in the cardboard in due in part to the increased surface exposure but is most noticeable in the case of cardboards which contain substances such as metals, sulphites, and other materials that tend to catalyze the development of rancidity. The presence of such catalyzers causes rancidity to develop almost immediately after the paper comes in contact with the baked products from which fat can be absorbed by the cardboard.

The present invention involves treatment of the cardboard with an antioxidant. Suitable antioxidant substances are:

Phenols, such as pyrogallol, hydroquinone, alpha or beta naphthol and galacetonin; amino phenols and derivatives and para amino phenol and its derivatives, such as mono-methyl-para amido phenol sulfate.

In one test in which one gram of fat was added to each of three identical samples of cardboard, subsequently incubated at 140° Fahrenheit, the following results were noted:

|  | Stability of fat by active oxygen method | Rancidity development when incubated at 140° F. |
|---|---|---|
| Hydrogenated vegetable shortening (stabilized). | 72 hours | Less than 1 day. |
| Oleo oil | 7 hours | Do. |
| Hydrogenated vegetable shortening. | 4 hours | Do. |

Similar samples of boards were treated with agents which are known to have a stabilizing effect on fats. These agents were pyrogallol and galacetonin, the boards being treated as follows: 2.5 grams of pyrogallol and galacetonin were each dissolved in 97.5 grams of alcohol, this giving a 2.5% solution. Pyrogallol and galacetonin were also mixed in 5% solutions.

Samples of cardboard 209 millimeters long and 71 millimeters wide, weighing 6.4 grams, were immersed in the alcohol stabilizer solutions and allowed to soak up 5 grams, giving a concentration of 0.125 grams of the stabilizing agent in each of the boards containing the 2.5% solutions, or 2% of the stabilizing products, based on the total weight of the boards.

The alcohol was then evaporated from the boards by means of a drying oven and the boards impregnated with 2 grams of melted stabilized hydrogenated vegetable shortening identical to that used in the previous test. The boards containing both the stabilizing materials and the shortening were then placed into covered glass jars and incubated at 140° Fahrenheit.

The following tabulation gives the results of these keeping tests as determined organoleptically from day to day on the incubated samples:

|  | Keeping time incubated at 140° F. |
|---|---|
| Plain board untreated, containing 2 gms. shorting. | 3 days. |
| Same (soaked in 2.5% solution pyrogallol). | Not rancid in 90 days. |
| Same (soaked in 5.0% solution pyrogallol). | Do. |
| Same (soaked in 5.0% solution galacetonin). | Do. |
| Same (soaked in 2.5% solution galacetonin). | Do. |

Specially manufactured cardboards are prepared in commercial practice for cracker boxes in which paraffin or silicate coatings are used for moisture proofing. The addition of antioxidants to these coatings produces a cardboard package which inhibits the development of rancidity. In addition to the antioxidants which have already been noted, other antioxidants such as gum guaiac may be used with equal success.

It will be understood, of course, that such antioxidants as pyrogallol and galacetonin which cause darkening of the color in cardboard when used in relatively large quantities may be used in quantities minute enough to avoid such darkening.

The antioxidant may be added to the paper stock at any time during or after manufacture. If desired, the antioxidant may be added to the pulp or at one of the stages in which the pulp is being formed into a sheet.

In the claims which follow, the term "paper" is used in the broad sense as including cardboard, fiber board, and the like.

I claim:

1. The method of packaging food products containing fats and oils normally tending to develop rancidity on storage which comprises wrapping said product in a paper having a phenol incorporated therein whereby such development of rancidity is substantially retarded.

2. The method of packaging food products containing fatty materials normally tending to deteriorate on storage, which comprises wrapping said product in a paper containing gallacetonin whereby such deterioration is substantially retarded.

3. The method of packaging food products containing fatty substances normally tending to deteriorate on standing, which comprises packing said product in a paper container having incorporated therein gum guaiac in sufficient amount to substantially retard such deterioration.

4. The method of packaging food products containing fatty materials normally tending to deteriorate in flavor and odor on storage, which comprises confining said product in a paper container having incorporated therein a small amount of pyrogallol whereby such deterioration is substantially retarded.

5. The method of packaging food products containing fats and oils normally tending to develop rancidity on storage which comprises wrapping said product in a paper having gum guaiac incorporated therein whereby such development of rancidity is substantially retarded.

HAROLD S. MITCHELL.